US 8,078,965 B2

(12) United States Patent
Wang-Aryattanwanich et al.

(10) Patent No.: US 8,078,965 B2
(45) Date of Patent: Dec. 13, 2011

(54) AUTOMATIC SWITCHING FONTS ON MULTILINGUAL TEXT RUNS

(75) Inventors: Thiti Wang-Aryattanwanich, Sammamish, WA (US); Nicholas Allen Robarge, Redmond, WA (US); Ziad Moh'd Ali Khalidi, Redmond, WA (US); Howard Lesley Cooperstein, Menlo Park, CA (US); Juraj Gottweis, Bellevue, WA (US); Lizanne Risa Maeda Infauku, Maple Valley, WA (US)

(73) Assignee: Microsoft Corporation, Redmond, WA (US)

( * ) Notice: Subject to any disclaimer, the term of this patent is extended or adjusted under 35 U.S.C. 154(b) by 962 days.

(21) Appl. No.: 11/799,457

(22) Filed: May 1, 2007

(65) Prior Publication Data

US 2008/0276166 A1 Nov. 6, 2008

(51) Int. Cl.
*G06F 17/28* (2006.01)
(52) U.S. Cl. ......... 715/264; 715/265; 715/269; 715/271
(58) Field of Classification Search .................. 715/265, 715/269, 271
See application file for complete search history.

(56) References Cited

U.S. PATENT DOCUMENTS

| 5,416,898 | A | 5/1995 | Opstad et al. | 345/468 |
| 6,718,519 | B1* | 4/2004 | Taieb | 715/269 |
| 6,760,887 | B1* | 7/2004 | Taieb | 715/269 |
| 6,813,747 | B1* | 11/2004 | Taieb | 715/269 |
| 7,031,002 | B1* | 4/2006 | Taieb | 358/1.11 |
| 2003/0187681 | A1* | 10/2003 | Spain | 705/1 |
| 2004/0088657 | A1* | 5/2004 | Brown et al. | 715/542 |
| 2004/0172601 | A1* | 9/2004 | Rettig et al. | 715/523 |
| 2006/0281058 | A1 | 12/2006 | Mangoaela | 434/157 |

FOREIGN PATENT DOCUMENTS

WO  WO 00/67117  11/2000

OTHER PUBLICATIONS

Person et al.; Special Edition Using Microsoft Word 97; Dec. 16, 1996; Que Publishing; pp. 307-343.*
Mittelbach eta l., "The LATEX3 Project", http://www.ntg.nl/maps/10/19.pdf , Published Date: Feb. 26, 1993, 5 pp.
Kakugawa et al., "A General Purpose Font Module for Multilingual Application Programs", http://citeseerx.ist.psu.edu/viewdoc/download?doi=10.1.1.6.3938&rep=rep1&type=pdf , Published Date: Mar. 16, 2000, 25 pp.

(Continued)

*Primary Examiner* — Doug Hutton, Jr.
*Assistant Examiner* — Andrew Dyer
(74) *Attorney, Agent, or Firm* — Merchant & Gould (57) ABSTRACT

Automatic switching of fonts on multilingual text runs in one action is provided. After an indication that a new font scheme is to be applied to a multilingual text selection, a client application passes a language identification for each of the multilingual text runs, a major/minor font designation for each text run, a script identification for each text run, if available, and the selected new font scheme to a font scheme application programming interface (API). The font scheme API converts the received language identification to a script identification for each multilingual text run and maps the resulting script identifications to appropriate fonts associated with the selected font scheme for each of the multilingual text runs. Fonts retrieved for each language text run are returned to the client application for rendering the multilingual text runs according to the respective fonts applicable to the selected font scheme.

18 Claims, 7 Drawing Sheets

OTHER PUBLICATIONS

Sakaguchi et al., "A Browsing Tool for Multi-Lingual Documents for Users without Multi-Lingual Fonts", http://delivery.acm.org/10.1145/230000/226944/p63-sakaguchi.pdf?key1=226944&key2=7755560521&coll=GUIDE&dl=GUIDE&CFID=49145614&CFTOKEN=93531842, Published Date:1996, 9 pp.

Durst et al., "Font Selection and Font Composition for Unicode", http://www.maparent.ca/~maparent/FontComposition.pdf, Published Date: Sep. 1995, 18 pp.

Mori et al., "A Multilingual System Using Internet Imaging", http://citeseerx.ist.psu.edu/viewdoc/download?doi=10.1.1.27.8145&rep=rep1&type=pdf, Retrieved Date: Aug. 19, 2009, 8 pp.

* cited by examiner

AUTOMATIC SWITCHING FONTS ON MULTILINGUAL TEXT RUNS

BACKGROUND

It is common practice to have multilingual text runs in a single document. For example, a document being used in an international business transaction may have text runs containing English text, Japanese text, Arabic text, etc. According to prior systems, there is no single font available from computer operating systems that contain all font types for all possible language scripts in the world. Therefore, software applications have to assign different fonts to different language text runs in a given text selection. For example, in multilingual documents containing English, Greek and Japanese, a first font is assigned to the English text run, a second font is assigned to the Greek text run and a third font is assigned to the Japanese text run. This limitation prevents changing fonts for each language text run in one action. In order to change the fonts of each language text run, each language text run must be selected (e.g., highlighted) followed by application of an available font to the selected language text run.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The above and other problems are solved by providing automatic switching of fonts on multilingual text runs in one action. According to an embodiment, each language text run entered in a document is tagged with a language identification (ID) property. For example, a Japanese text input in a document is tagged with a language identification for Japanese text runs, and an English language text input in the document is tagged with an English language text identification. After an indication that a font for each of the multilingual text runs is to be changed, a client application responsible for displaying and allowing entry of the text runs passes the language identification for each of the multilingual text runs, a major/minor font designation, a script identification, if available, and the selected new font to a font scheme application programming interface (API). The font scheme API converts the received language identification to a script identification for each multilingual text run and maps the resulting script identifications to appropriate fonts for each of the multilingual text runs. According to embodiments, the script identifications for each of the example text runs will allow the font scheme APIs to retrieve the appropriate font for each of the associated multilingual text runs. For example, a user may select a font scheme referred to as "classic" from a font selection menu for application to a multilingual text selection. The "classic" font scheme for English language text runs may resolve to "Arial" font, and the "classic" font scheme for Japanese text runs may resolve to "MS PGothic" font. Once the font scheme APIs retrieve the required fonts for each of the multilingual text runs, the fonts are returned to the client application for rendering the multilingual text runs according to the respective fonts applicable to the font scheme selected for the multilingual text runs.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to automatic switching fonts on multilingual text runs in an electronic document in one action. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Figure 1:
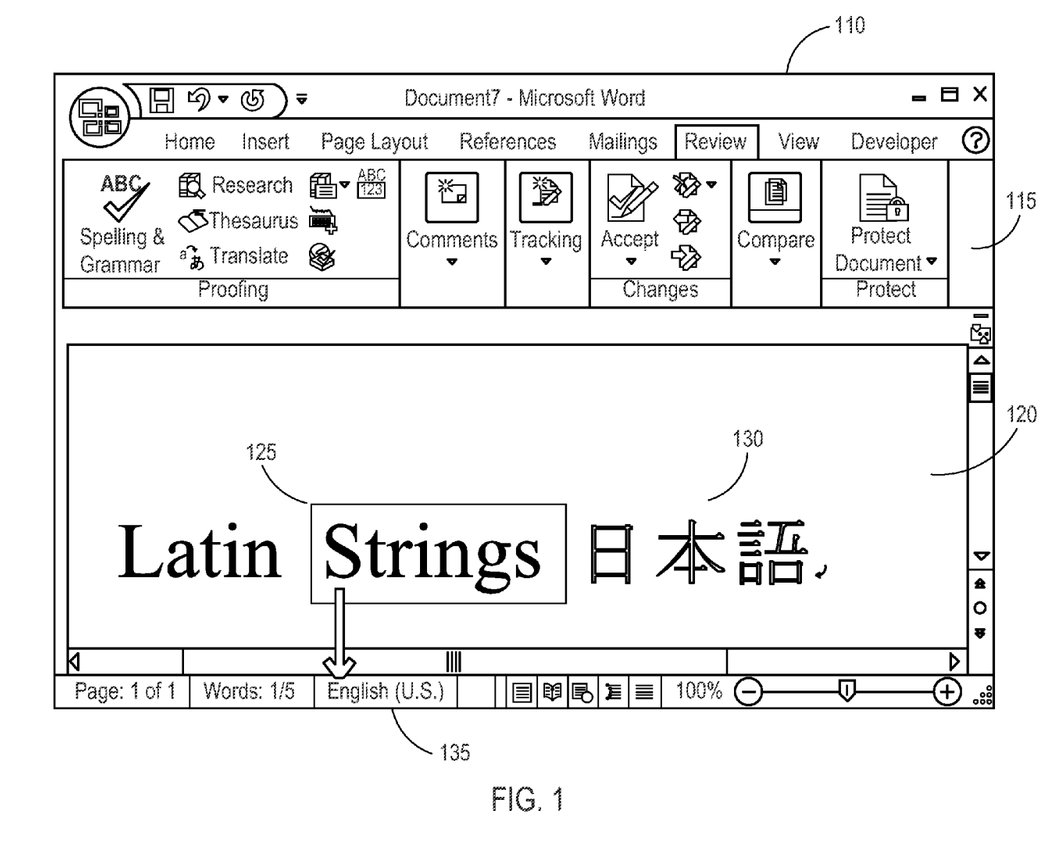
FIG. 1 illustrates a computer screen display of a graphical user interface showing a multilingual text run including a Latin text string and a Japanese text string.

FIG. 1 illustrates a computer screen display of a graphical user interface showing a multilingual text string including a Latin text run and a Japanese text run. The graphical user interface 110 is illustrative of a user interface provided by a client application 100 (illustrated in FIG. 7), for example, a word processing application, a slide presentation application, a spreadsheet application, a desktop publishing application, or any other client application capable of receiving and allowing editing and display of text strings that include multilingual text runs. The graphical user interface 110 includes an array of functionality buttons and controls 115 for allowing the application of functionalities of the client application to text, data and/or objects entered into a work area 120.

As illustrated in FIG. 1, a text string including a Latin text run 125 and a Japanese text run 130 has been entered into the work space 120. For example, the text runs 125, 130 may be part of a multilingual document being prepared for use in an international negotiation between two parties whose languages include Latin derivatives (for example, English) and Japanese. As further illustrated in FIG. 1, the present keyboard language associated with the client application responsible for displaying the text runs 125, 130 is US English as indicated in the keyboard language display tab 135. As will be described below, the present keyboard language selected for the client application may be used for causing the client application 100 to provide available font schemes when font scheme selection for a given text selection is desired.

Figure 2:
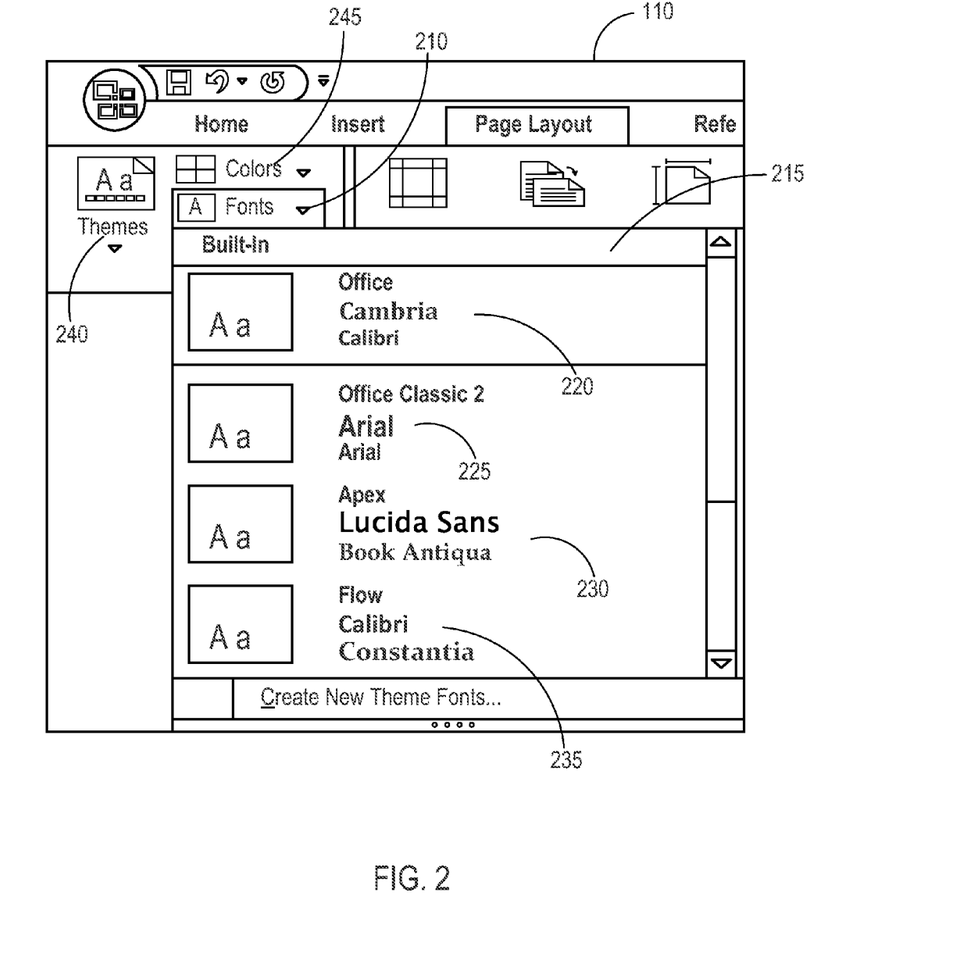
FIG. 2 illustrates a computer screen display of an English keyboard-based font selection user interface with which a font scheme may be selected for application to one or more text runs in a document.

According to an embodiment, a given client application may be programmed with one or more font schemes that may be applied to different language text runs in an electronic document. FIG. 2 illustrates a computer screen display of an English keyboard-based font selection user interface with which a font scheme may be selected for application to one or more text runs in a document. As should be appreciated from the following discussion, a font scheme may include a predefined font type that may be selectively applied to a text/data string to apply a desired shape and visual quality to the text/data string. As described below, a given font scheme may include a predefined major font type that may be applied to text/data designated as major, for example, a document heading, and the font scheme may included a predefined minor font type that may be applied to text/data designated as minor, for example, document text positioned under a heading.

As illustrated in FIG. 2, the font scheme menu 215 may be deployed in the user interface 110 upon selection of a fonts control 210 for providing a listing of selectable font schemes that may be applied to a given text selection. The font schemes 220, 225, 230, 235 shown in FIG. 2 are illustrated for font schemes applicable to US-based English language text runs and which may be different for other language text runs, as described below. That is, if the keyboard language setting for the client application is set to US-based English, then one set of font schemes 220-235 may be provided in the menu 215, but if the keyboard language designation is switched to a different language, for example Japanese, then the font schemes applicable to Japanese language text runs will be listed for application to a given text run. As should be appreciated, many different font schemes may be available for different languages depending on the programming of the client application.

Figure 3:
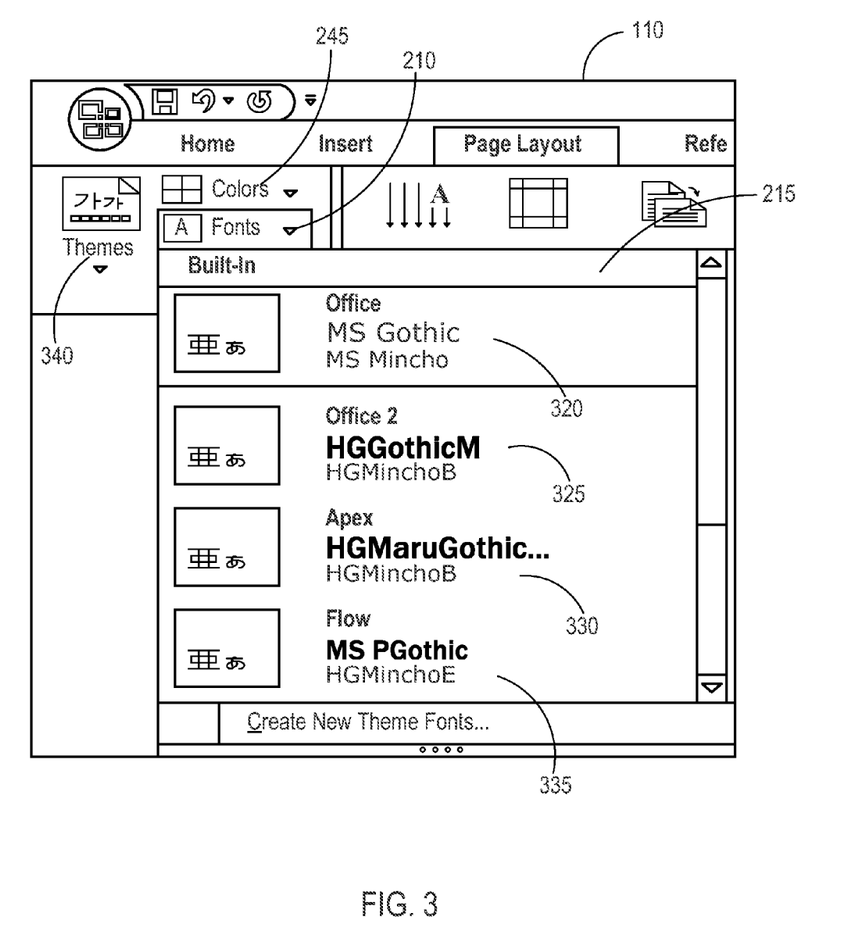
FIG. 3 illustrates a computer screen display of a Japanese keyboard-based font selection user interface with which a font scheme may be selected for application to one or more text runs in a document.

FIG. 3 illustrates a computer screen display of a Japanese keyboard-based font selection user interface with which a font scheme may be selected for application to one or more text runs in a document. As illustrated in FIG. 3, the keyboard language designation for the example client application has been switched to Japanese, and thus, the font scheme menu 215 provides a list of font schemes available for application to Japanese text runs in an electronic document.

Referring still to FIGS. 2 and 3, for each font scheme 220-235 and 320-335, a font scheme label, for example, "Office", "Office Classic II", "APEX", "Flow," is provided for which a pre-designed font scheme may be applied to a selected text run. For example, referring to FIG. 2, the "Office" font scheme 220 shows a major font designation of "Cambria" and a minor font designation of "Calibri." According to embodiments, a given font scheme, for example, the "Office" font scheme 220 may be selectively applied to the text and/or data contained in a document, and automatically, the "Cambria" font type will be applied to text runs associated with a major font designation, and the font "Calibri" will be applied to portions of the text or data associated with a minor font designation. For example, in a document template, headings may be designated as receiving major font designations and text contained underneath headings may be designated for receiving minor font designations. By applying a font scheme, for example, the "Office" font scheme 220, each portion of the document designated as a major font designation will automatically receive the major font type and each portion of text or data contained in the document designated as a minor font designation will receive application of the minor font type. Thus, the user may quickly and efficiently apply a given font scheme to a document for creating a visually pleasing document display. As should be appreciated, the font schemes and associated major and minor font types illustrated in FIGS. 2 and 3 are for purposes of example only and are not limiting of the numerous font schemes that may be created for application to text and data runs contained in an electronic document.

Often a given font type applicable to one language run is not applicable to a different language run in the same document either because the programming of the client application will not allow application of the selected font type to the second language text run, for example, where a particular glyph in the different language run is not supported by the given font type, or because developers of the client application have determined that application of the selected font type to the second language text run is not visually pleasing. For example, selection of the "Office" font scheme 220 with its associated major font type of "Cambria" and its minor font type of "Calibri" may not be applicable to a Japanese text run in an electronic document either because the client application may not apply those font types to a Japanese text run or because it has been determined that application of those font types to a Japanese text run will render the Japanese text run illegible or visually displeasing. In such situations, developers of the client applications designate different font types for the same font scheme for different language text runs. For example, referring back to FIG. 3, when the example user interface 110 is switched to a Japanese keyboard input language, the font types for each of the font schemes 320-335 are different for each of the font schemes than are provided for the English language text runs, illustrated in FIG. 2. For example, the "Office" scheme 320 in a Japanese keyboard input language resolves to a major font type of "MS Gothic" and a minor font type of "MS Mincho." Thus, if the "Office" scheme 220 is selected from the English language menu 215, illustrated in FIG. 2, a major font type of "Cambria" and a minor font type of "Calibri" will be applied to an associated English language text run. On the other hand, if the "Office" font scheme 320 is selected from the menu 215 illustrated according to a Japanese keyboard input language, shown in FIG. 3, then a major font type of "MS Gothic" and a minor font type of "MS Mincho" will be applied to an associated Japanese language text run. As briefly described above, according to prior systems, in order to apply a given font scheme to multilingual text runs, the user had to first select the first language text run, for example, English language, followed by selection of the English-based font scheme 220, followed by a separate application of a font scheme applicable to the second language text run, for example Japanese. That is, the user could not automatically switch the fonts on two or more language text runs with a single action.

According to embodiments of the present invention, a user may select a desired font scheme 220-235 or 320-335 from the applicable font scheme menu for automatic application to multilingual text runs in a given document. For example, if a user has a text document containing both English and Japanese text runs, and the user has her keyboard language designation as US-based English, then the user may select a font scheme 220-235 from the English-based menu 215, illustrated in FIG. 2. When the user selects a given font scheme, for example, font scheme 220, the major and minor font types associated with this selected font scheme will be applied to the English text runs in the associated document or portion of document, and immediately thereafter, the major and minor font types associated with the corresponding font scheme 330, illustrated in FIG. 3, will be applied to Japanese text runs in the document or portion of document.

As should be appreciated, embodiments of the present invention are equally applicable regardless of the present keyboard input language designation for the client application and user interface 110. For example, if a document contains an English language text run and a Japanese language text run, a user may selectively apply a new font scheme to both language text runs from either the English language display illustrated in FIG. 2 or from the Japanese language display illustrated in FIG. 3.

If the document or portion of document for which the user has selected for font scheme change includes other languages, then the font types associated with the selected font scheme for each of the other languages likewise will be applied to each text run of the other languages. If a given language, for example, Dutch, has not been associated with a major and minor font type for a selected font scheme, then a default combination of major and minor font types may be applied to the text runs of that language as programmed by the developer of the client application responsible for applying the selected font scheme to the text run. For example, a default major font type of "Cambria" and a default minor font type of "Calibri" may be applied to any language text run for which a specified major/minor font type has not been designated.

According to embodiments, inside each font scheme 220-235 and 320-335, the font scheme is defined to associate the major and minor font types with a script identification (ID). According to one embodiment, the script IDs follow the ISO 15924 script ID standard, and may include script IDs defined specific to a given client application that are not included in the standard. Each script identification in a given font scheme may contain font types that support character glyphs for the script as illustrated in the sample font scheme definition shown in Table 1 below. For purposes of example, the font scheme definition shown in Table 1 is in the form of an Extensible Markup Language (XML) font scheme definition.

TABLE 1

```
<a:fontScheme name="Alpha">
    <a:majorFont>
        <a:latin typeface=""/>
        <a:ea typeface=""/>
        <a:cs typeface=""/>
        <a:font script="Latn" typeface="Times New Roman"/>
        <a:font script="Jpan" typeface="MS Mincho"/>
        <!- more script fonts for more languages in between->
        <a:font script="Viet" typeface="Times New Roman"/>
        <a:font script="Uigh" typeface="Microsoft Uighur"/>
    </a:majorFont>
    <a:minorFont>
        <a:latin typeface=""/>
        <a:ea typeface=""/>
        <a:cs typeface=""/>
        <a:font script="Latn" typeface="Arial"/>
        <a:font script="Jpan" typeface="MS Gothic"/>
        <!- more script fonts for more languages in between->
        <a:font script="Viet" typeface="Times New Roman"/>
        <a:font script="Uigh" typeface="Microsoft Uighur"/>
    </a:minorFont>
</a:fontScheme>
```

As illustrated in the font scheme definition set out above in Table 1, for a given font scheme, for example, the font scheme entitled "Alpha" illustrated above, major and minor fonts are designated for each language. As described above, if a major and/or minor font is not available for a given language, a default major font and/or a default minor font may be designated for the particular language. As should be appreciated, a font scheme definition, such as the font scheme definition illustrated in Table 1, may be prepared for each font scheme available according to a given client application, such as the example font schemes 220-235 and 320-335 illustrated in FIGS. 2 and 3. As should be appreciated, the sample font scheme definition illustrated in Table 1 is for purposes of example and is not limiting of the vast number of font scheme definitions that may be prepared according to the present invention for mapping text run language IDs to particular font types for particular text languages.

As will be described below, when a given font scheme is selected for text or data contained in an electronic document, the associated font types for each text run language contained in the selected text or document are determined by mapping the language ID associated with each text run language to the corresponding font type defined in the font scheme definition for each associated language. According to one embodiment, a given language type, for example, Arabic may be designated with a single language ID, but the language ID may apply to multiple languages identified under the general language type of "Arabic." That is, a language ID for the language "Arabic" may return major and minor font types that will be applied to multiple different Arabic languages grouped under a single language ID.

Referring still to Table 1, if font scheme "Alpha" is selected for application to a document containing an English language text run, a Japanese language text run and a Vietnamese language text run, the English language ID would map to a major font type of "Times New Roman," the language ID for the Japanese text run would map to a major font type of "MS Mincho," and the Vietnamese language ID would map to a major font type of "Times New Roman." Each of these respective language IDs would map to minor font types as set out in the lower portion of the font scheme definition illustrated in Table 1. For example, for a selection of font scheme "Alpha," the language ID for the English language text run maps to a minor font type of "Arial."

According to embodiments, in order for the client application 100 to obtain major and/or minor font types for a selected font scheme, one or more application programming interfaces (API) may be utilized for passing parameters associated with language text runs contained in a given document to the applicable font scheme definition (as illustrated in Table 1 above) for returning the font types required for each language text run contained in the document. A first API, GetTypeface, may be used as a generic interface API that will query the font types from the font scheme definition in response to a call from the client application 100. This API may receive two parameters from the client application in order to query the font scheme definition in response to application of a selected font scheme 220-235, 320-335 to a given text selection. A first parameter is whether a given text run in the text selection has a major or minor font designation. A second parameter includes one of the three major font language types of Latin, East Asian or Complex Scripts. This API may be used when the language of a given text run is not designated as a particular language ID, for example, English, Japanese, Spanish, etc., but is only designated according to one of the three broad language types of Latin, East Asian or Complex Scripts.

A second API, GetTypefaceForLID, may be used when a language ID is assigned to a given text run for which a new font scheme is selected. This API will receive from the client application a language ID parameter and a parameter for major/minor font designation. This API will then call a conversion function for mapping and converting the language ID to a corresponding script ID, using internal converter functions. The API may then query the font scheme definition (see Table 1) for a font type associated with the script ID and major/minor font designation. The font type queried from the font scheme definition is then returned by the API back to the calling function, for example, the calling client application 100.

A third API, GetTypefaceForScriptTag, may be used when a given text run is already tagged with a script ID that may be mapped to a font type in the font scheme definition without conversion of language ID to script ID. This API will receive from the client application a script ID parameter and a parameter for major/minor font designation. This API will go to the font scheme and query the font directly with the script ID and major/minor font designation.

According to embodiments, the above-mentioned processes may work in an iterative manner where parameters for each successive text run are passed to the appropriate API for retrieving a required font. For example, if a given sentence of text contains a first text run having an East Asian language, but having no language ID, and having a minor font designation, and a second text run having a language ID and a major font designation, and a third text run having a script ID associated with a particular language and a minor font designation, then the parameters for the first text run may be sent to the GetTypeface API, the parameters for the second text run may be sent to the GetTypefaceForLID API and the parameters for the third text run may be sent to the GetTypefaceForScriptTag API. Each API will query the font scheme definition and return a font to the client application with which each respective text run may be formatted. For example, if a client application passes the language ID of Japanese text to the GetTypefaceForLID API, the API will convert the language ID to a "Jpan" script ID and then map the converted script ID to the appropriate font in the font scheme definition. If a font for the "Jpan" script ID exists in the font scheme definition, the API will return the font information back to client application. If the font does not exist, then a default font may be returned as designated by a developer of the client application or font scheme definition.

Figure 4:
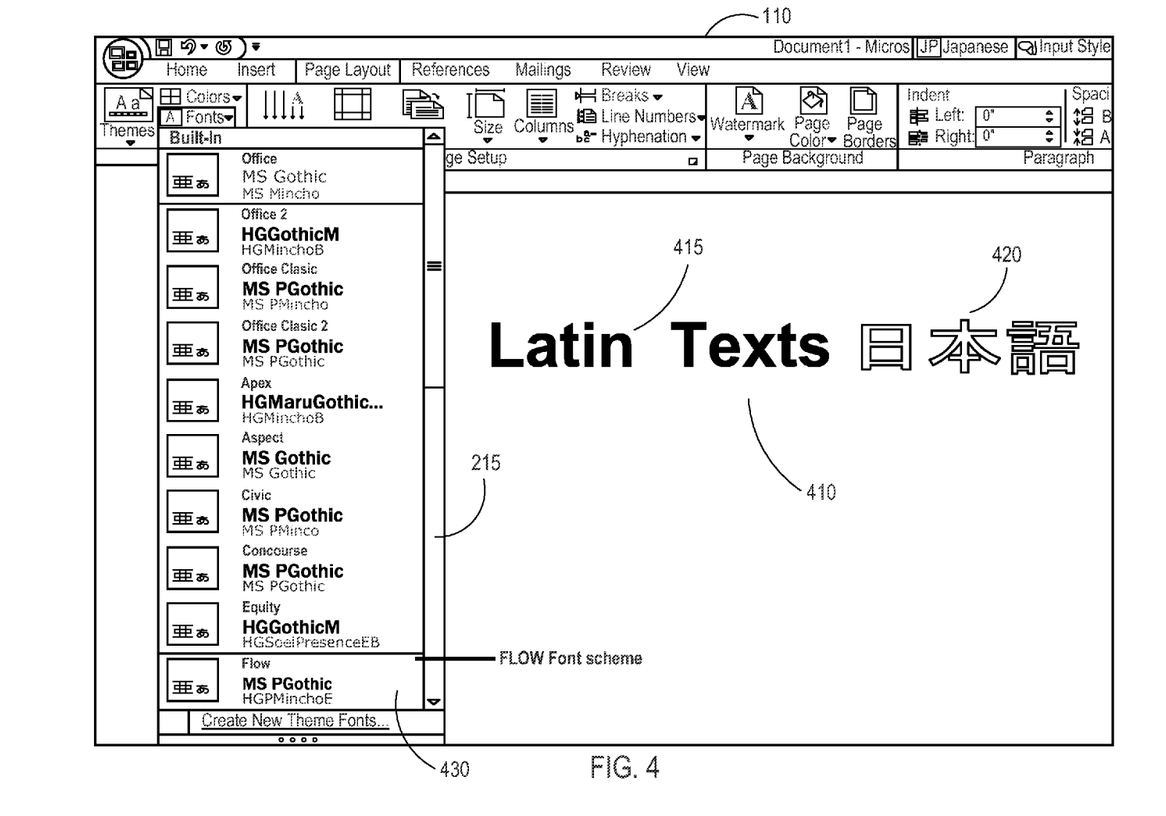
FIGS. 4 and 5 illustrate computer screen displays showing the automatic switching of fonts on multilingual text runs.

Referring now to FIG. 4, the user interface 110 is illustrated having a text string 410 containing a Latin text run 415 and a Japanese text run 420. The text string is illustrative of any document or portion of a document containing multilingual text runs to which font scheme changes may be applied as described herein. As illustrated in FIG. 4, the user interface 110 is operating according to a Japanese keyboard language identifier so that the menu 215 when deployed illustrates Japanese language font schemes that may be selected for application to the text string 410. Thus, when the menu 215 is deployed, the available font schemes are illustrated with major and minor font types associated with the Japanese language. As illustrated, the font scheme of "Flow" with its major font type of "MS PGothic" and minor font type of "HGPMinchoE" is presently applied to the Japanese language text run 420, and as described above, the major and minor font types for the "Flow" font scheme applicable to the Latin text run 415 (for example, English language text run) are applied to the Latin text run 415. As should be understood from the forgoing, the major or minor fonts of each scheme illustrated in FIGS. 4 and 5 (described below) are applied depending on whether the respective text runs are designated as major or minor.

Figure 5:
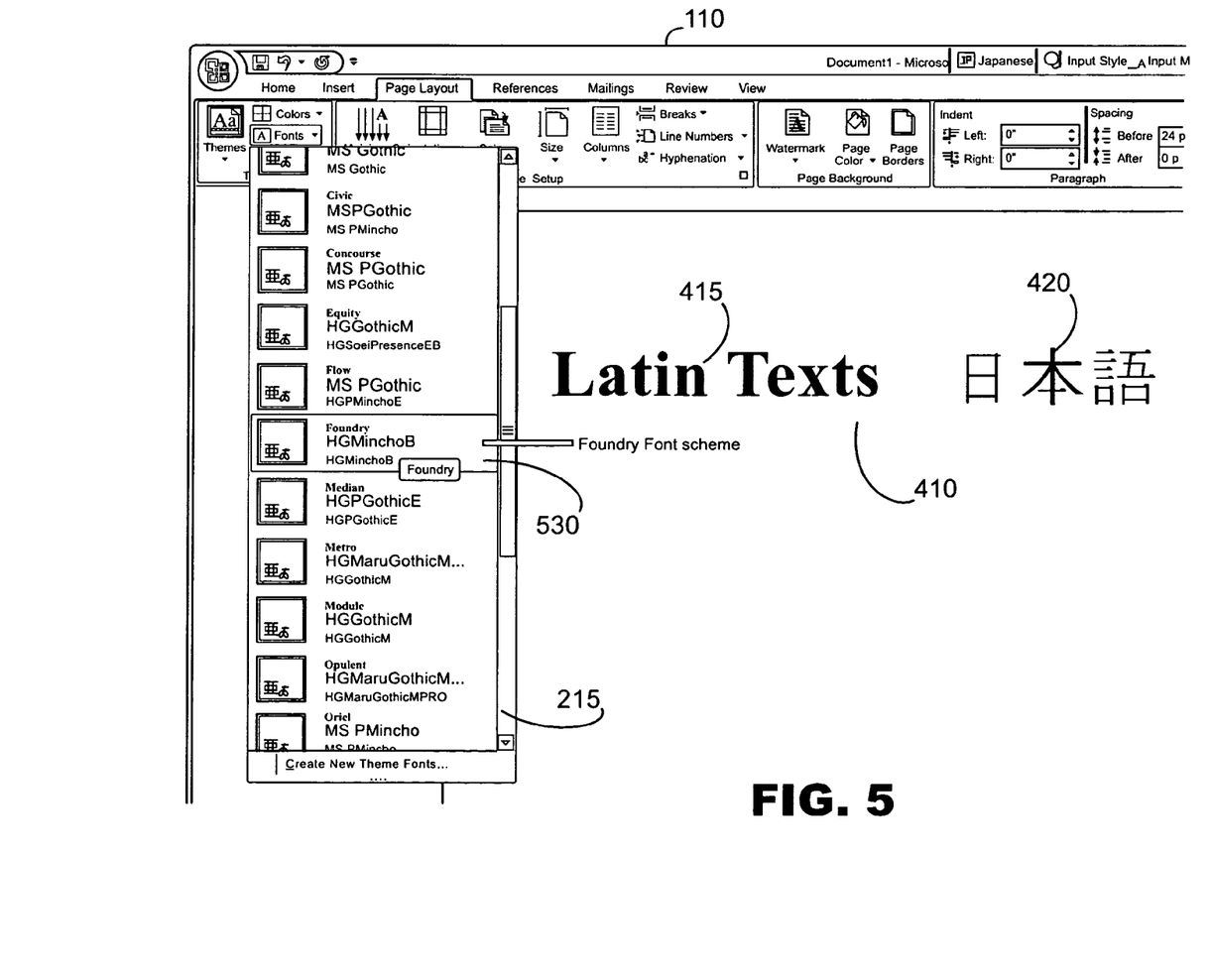

Referring now to FIG. 5, as will be described in detail below, if the user selects a different font scheme, for example, the "Foundry" font scheme 530, the associated Japanese language major font type of "HGMinchoB" is applied to the Japanese text run 420 if the text run is designated as a major, and the associated Japanese minor font type of "HGMinchoB" is applied to the Japanese language text run 420 if the text run is designated as a minor. As will be described below, the Latin (for example, English) major or minor font types associated with the "Foundry" font scheme will be applied to the Latin language text run 415, as illustrated in FIG. 5. As mentioned above, the particular font scheme names, for example, "Flow" and "Foundry," and the associated font types illustrated in FIGS. 1 through 5 are for purposes of example only and are not limiting of the vast number of font schemes and associated font type combinations that may be created for application to text runs as described herein.

Figure 6:
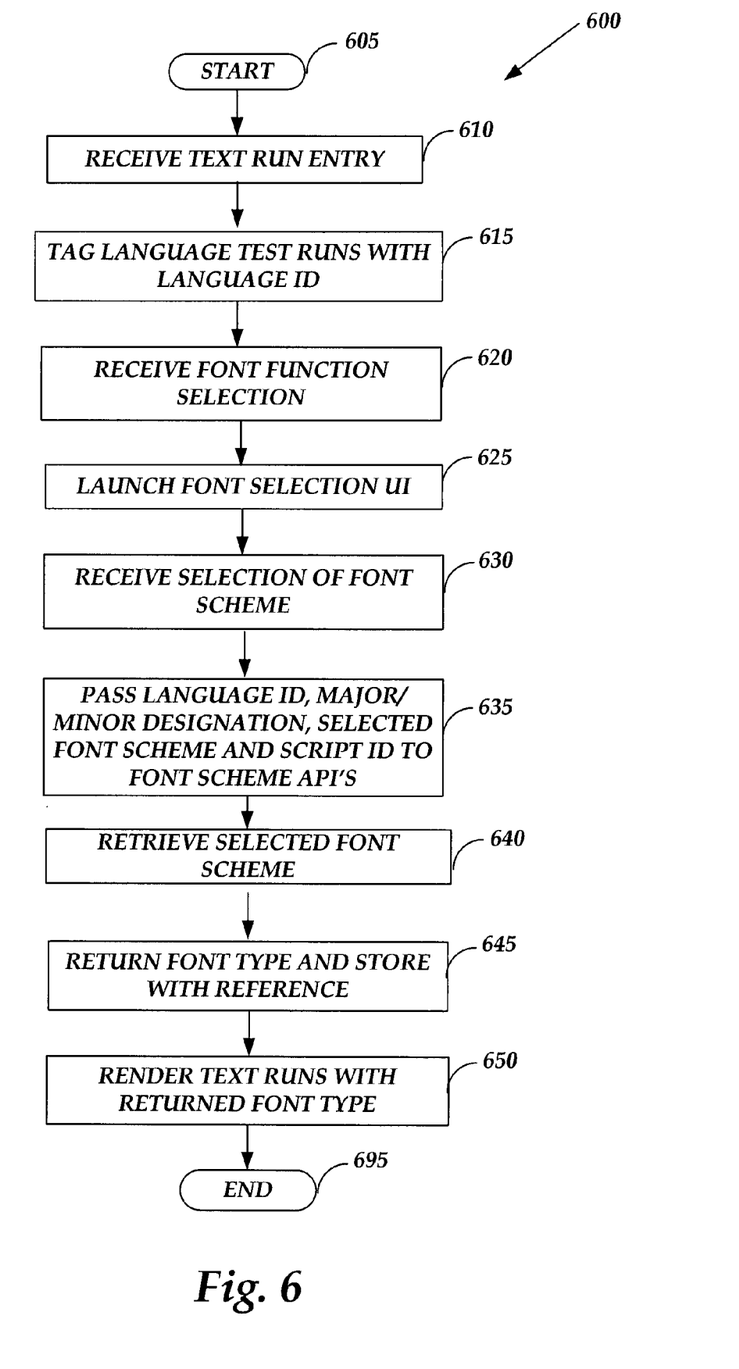
FIG. 6 is a logical flow diagram illustrating a method of automatic switching fonts on a multilingual text run.

Having described aspects of various embodiments of the present invention above with reference to FIGS. 1 through 5, it is advantageous to further describe embodiments of the present invention with respect to an example operation with respect to the example multilingual text string illustrated in FIGS. 4 and 5. Referring now to FIG. 6, a logical flow diagram illustrating a method of automatically switching fonts on a multilingual text run is presented and described. The method 600 begins at start operation 605 and proceeds to operation 610 where a multilingual text entry 410 is received as illustrated in FIG. 4. When the multilingual text entry 410 is entered, the text is entered according to a given font scheme applied to text entered into an associated document as selected by a user of the associated client application 100 or as selected by default by developers of the associated client application. For purposes of example, consider that the client application is a word processing application with which a user is preparing a multilingual document containing different language text runs to which the user desires to apply a new font scheme.

At operation 615, individual language text runs, for example, the Latin text run 415 and the Japanese text run 420 are tagged with language IDs associated with the particular languages. For example, the English language text run 415 may be tagged with a language ID such as "EN-US" or with an operating system language identifier such as Windows OS Language ID 1033. Likewise, the Japanese text run 420 may be tagged with a language ID such as the identifier "JP-JP" or with an operating system language ID, such as Windows OS Language ID 1041. As should be appreciated, other language text runs, for example, French, Chinese, Spanish, Arabic, and the like, may be tagged with language IDs applicable to these languages. As described above, in some cases, a given language text run may also be tagged with a particular script ID in addition to a particular language ID when the text run is entered.

At operation 620, a font function selection is received at the client application where a user of the client application selects a font control 210 for deploying a font scheme menu 215 for selecting a new font scheme for application to a desired document or a portion of document. At operation 625, the menu 215 is launched and lists available font schemes, as described above with reference to FIGS. 2-5.

At operation 630, a selection of a new font scheme for application to the text string 410 is received by the client application. For example, as illustrated in FIGS. 4 and 5 above, a user may select the font scheme "Foundry" 530 for applying to the text string 410 and for replacing the presently applied font scheme "Flow" 430.

At operation 635, in response to a selection of new font scheme 530, the client application 100 queries the font scheme definition, as illustrated above in Table 1, for font types applicable to language text runs contained in the selected document or portion of document to which the new font scheme is to be applied. If the language text runs in the document or portion of document to which the new font scheme is to be applied do not include language IDs associated with particular languages, the method follows a default operation in which the GetTypeface API, described above, may be called by the client application for obtaining default font types associated with the selected font scheme. In this case, the client application may pass two parameters to the GetTypeface API, including a first parameter that identifies whether a given text run requires a major or minor font type and a second parameter that identifies one of three major font languages, including Latin, EA and CS. If the GetTypeface API is utilized, a default font type associated with the major or minor font designation and associated with one of the three designated language types may be returned from the font scheme definition for application to the selected text run.

If a selected text run, for example, English, Japanese, Arabic, etc., is tagged with an associated language ID, the client application 100 may call the GetTypefaceForLID API described above. In this case, the client application may pass the major or minor font designation parameter associated with the text run and the language ID for the text run to the GetTypefaceForLID API. The GetTypefaceForLID API may, in turn, pass the language ID parameter for the selected text run to a conversion API for mapping the language ID to an associated script ID. The script ID may then be used by the GetTypefaceForLID API for querying the font scheme definition, illustrated above in Table 1, for returning a font type to the client application for the new font scheme applied to the text run.

If a given text run, for example, a Japanese language text run, is already tagged with a script ID, the client application 100 may call the GetTypefaceForScriptTag API, and the client application may pass to this API the major or minor font parameter and the script ID parameter. Conversion of a language ID to a script ID will not be necessary in this case. The GetTypefaceForScriptTag API may then query the font scheme definition, illustrated in Table 1 above, with the script ID and major or minor font designation received from the client application 100 for returning a font type back to the client application associated with the new font scheme selected for the particular text run.

At operation 640, the APIs described above retrieve selected fonts for each text language run contained in the document or portion of document to which the new font scheme is being applied. That is, if a portion of text, for example, a paragraph, includes an English language text run, a Japanese language text run, and an Arabic language text run, the client application 100 will obtain a font type from the font scheme definition for each of the respective text language runs using the applicable API described above. For example, if the English language text run, is a minor font type and has been tagged with a language ID, then the client application will utilize the GetTypefaceForLID API to return a minor font from the selected font scheme for English language. On the other hand, if the Japanese language text run is of a major font type and is already tagged with a particular script ID, then the client application may utilize the GetTypefaceForScriptTag API, described above. Finally, if the third language text run is not tagged with a particular language ID or script ID, the client application 100 may utilize the GetTypeface API for returning a default font type that may be applied to the example Arabic language text run. According to one embodiment, if a given text language run is not designated as major or minor, a default font type associated with a minor font type may be returned.

At operation 645, the retrieved fonts are returned to the client application 100 and are stored for subsequent use in rendering the text runs according to the new font scheme. According to one embodiment, the client application maintains a reference value to each stored font so that the client application may retrieve the stored font types during the next text rendering operation. At operation 650, the client application 100 calls the stored font types for each text run contained in the document or portion of document to which the new font scheme is to be applied, and the client application renders the associated text with the retrieved fonts. According to embodiments, the above described processes may be repeated iteratively until all text runs of a text selection are formatted with fonts associated with a selected font scheme. The method ends at operation 695.

Operating Environment

Figure 7:
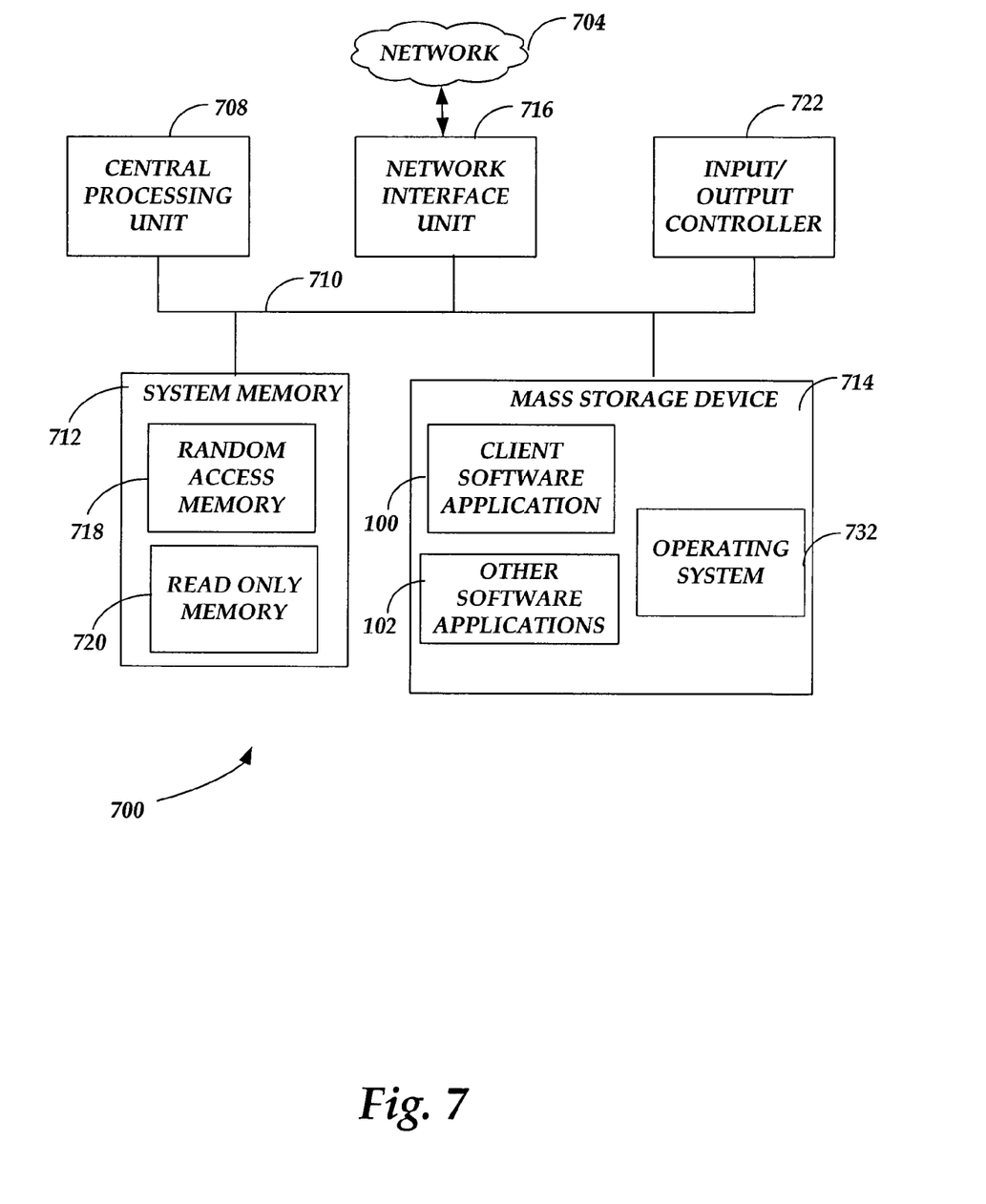
FIG. 7 is a simplified block diagram illustrating an example computing operating environment in which embodiments of the invention may be practiced.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computer 700 comprises a general purpose desktop, laptop, handheld, mobile or other type of computer (computing device) capable of executing one or more application programs. The computer 700 includes at least one central processing unit 708 ("CPU"), a system memory 712, including a random access memory 718 ("RAM") and a read-only memory ("ROM") 720, and a system bus 710 that couples the memory to the CPU 708. A basic input/output system containing the basic routines that help to transfer information between elements within the computer, such as during startup, is stored in the ROM 720. The computer 702 further includes a mass storage device 714 for storing an operating system 732, application programs, and other program modules.

The mass storage device 714 is connected to the CPU 708 through a mass storage controller (not shown) connected to the bus 710. The mass storage device 714 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available media that can be accessed or utilized by the computer 700.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 700.

According to various embodiments of the invention, the computer 700 may operate in a networked environment using logical connections to remote computers through a network 704, such as a local network, the Internet, etc. for example. The computer 702 may connect to the network 704 through a network interface unit 716 connected to the bus 710. It should be appreciated that the network interface unit 716 may also be utilized to connect to other types of networks and remote computing systems. The computer 700 may also include an input/output controller 722 for receiving and processing input from a number of other devices, including a keyboard, mouse, etc. (not shown). Similarly, an input/output controller 722 may provide output to a display screen, a printer, or other type of output device.

As mentioned briefly above, a number of program modules and data files may be stored in the mass storage device 714 and RAM 718 of the computer 700, including an operating system 732 suitable for controlling the operation of a networked personal computer, such as the WINDOWS® operating systems from MICROSOFT CORPORATION of Redmond, Wash. The mass storage device 714 and RAM 718 may also store one or more program modules. In particular, the mass storage device 714 and the RAM 718 may store application programs, such as a software application 724, for example, a word processing application, a spreadsheet application, a slide presentation application, a database application, etc.

According to embodiments of the present invention, a client software application 100 is illustrated with which a document may be created and edited, and with which a font scheme may be selected for application of associated fonts to multilingual text runs in a text selection as described above. Examples of the client application 100 include word processing applications, slide presentation applications, spreadsheet applications, desktop publishing applications, and any other application 102 allowing the application of fonts to text and/or data.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various embodiments, those of ordinary skill in the art will understand that many modifications may be made thereto within the scope of the claims that follow. Accordingly, it is not intended that the scope of the invention in any way be limited by the above description, but instead be determined entirely by reference to the claims that follow.

We claim:

1. A method of automatically switching fonts on multilingual text runs in a text selection, comprising:
   receiving a text selection having a plurality of text runs, wherein a first text run is in a first language and wherein at least a second text run is in a different language;
   receiving an indication of a selection of a font scheme for applying to the text selection, wherein the font scheme comprises a plurality of different font types for each of the plurality of text runs, the plurality of different font types including at least two different font types associated with only the first language in the first text run and at least two different font types associated with only the different language in the second text run, wherein the plurality of different font types in the font scheme are predefined font types, wherein an application of the at least two different font types associated with only the first language in the first text run to the second text run renders the second text run illegible;
   in response to receiving an indication of a selection of the font scheme for applying to the text selection, querying a font scheme definition for the selected font scheme to determine the at least two different font types associated with only the first language in the first text run and the at least two different font types associated with only the different language in the second text run;
   in response to querying the font scheme definition for the selected font scheme to determine the at least two different font types associated with only the first and different languages in the first and second text runs, retrieving the at least two different font types for the selected font scheme for each of the first and second text runs;
   rendering the text selection, wherein the first text run is rendered according to the at least two different one-font types associated with only the first language retrieved for the first text run and wherein, after the first text run is rendered, the second text run is rendered according to the at least two different font types associated with only the different language retrieved for the second text run, wherein the second text run is automatically rendered immediately following the rendering of the first text run after the selection of the font scheme for applying to the text selection; and
   wherein the selection of the font scheme for applying the text selection comprises a single action.

2. The method of claim 1, after receiving a text selection having a plurality of text runs, tagging each of the first and second text runs with a language identification (ID) associated with each of the first and different languages.

3. The method of claim 2, further comprising tagging each of the first and second text runs with both a major font designation and a minor font designation.

4. The method of claim 3, further comprising tagging each of the first and second text runs with a script identification (ID).

5. The method of claim 1, wherein receiving an indication of a selection of a font scheme for applying to the text selection, further comprises providing a menu of font schemes for applying to the text selection.

6. The method of claim 5, further comprising providing the menu of font schemes for applying to the text selection based on a keyboard language identification applicable to the menu of font schemes wherein the menu of font schemes includes font schemes applicable to text runs associated with the keyboard language identification.

7. The method of claim 1, wherein the at least two different font types associated with only the first language in the first text run are applicable to both a major and a minor font designation of the first text run, and wherein the at least two different font types associated with only the different language in the second text run are applicable to both a major and a minor font designation of the second text run.

8. The method of claim 1, after retrieving the at least two different font types for the selected font scheme for each of the first and second text runs, associating a reference value with each of the retrieved at least two different font types.

9. The method of claim 1, prior to querying the font scheme definition for the selected font scheme to determine the at least two different font types associated with only the first and different languages in the first and second text runs, passing a parameter identifying a language associated with each of the first and second text runs to the font scheme definition.

10. The method of claim 9, wherein passing a parameter identifying a language associated with each of the first and second text runs to the font scheme definition includes passing a language identifier (ID) parameter for each of the first and second text runs via an application programming interface operative to map the language ID associated with each of the first and different languages to each of the at least two different font types.

11. The method of claim 10, further comprising passing a parameter identifying whether each of the first and second text runs are associated with both a major font type and a minor font type, and wherein the application programming interface is further operative to map both a major and a minor font designation for each of the first and second text runs to each of the at least two different font types in the font scheme definition.

12. The method of claim 9, wherein passing a parameter identifying a language associated with each of the first and second text runs to the font scheme definition includes passing a script (ID) parameter for each of the first and second text runs via an application programming interface operative to map the script ID for each of the first and second text runs to each of the at least two different font types in the font scheme definition.

13. The method of claim 9, wherein the application programming interface is further operative to convert the language ID for each of the first and second text runs to a script (ID) for each of the first and second text runs that may be mapped to each of the at least two different font types in the font scheme definition.

14. A computer storage device containing computer executable instructions which when executed by a computing device perform a method of automatically switching fonts on multilingual text runs in a text selection, comprising:

receiving a text selection having a plurality of text runs, wherein a first text run is in a first language and wherein at least a second text run is in a different language;

receiving an indication of a selection of a font scheme for applying to the text selection, wherein the font scheme comprises a plurality of different font types for each of the plurality of text runs, the plurality of different font types including at least two different one-font types associated with only the first language in the first text run and at least two different font types associated with only the different language in the second text run, wherein the plurality of different font types in the font scheme are predefined font types, wherein an application of the at least two different font types associated with only the first language in the first text run to the second text run renders the second text run illegible;

in response to receiving an indication of a selection of the font scheme for applying to the text selection, passing a language identifier (ID) parameter for each of the first and second text runs via an application programming interface operative to map a language ID for each of the first and second text runs to the plurality of different font types in a font scheme definition for the selected font scheme;

querying the font scheme definition for the selected font scheme to determine the at least two different font types associated with only the first language in the first text run and querying the font scheme definition for the selected font scheme to determine the at least two different font types associated with only the different language in the second text run;

in response to querying the font scheme definition for the selected font scheme to determine the at least two different font types associated with only the first and different languages in the first and second text runs, retrieving the at least two different font types for the selected font scheme for each of the first and second text runs;

rendering the text selection, wherein the first text run is rendered according to the at least two different font types associated with only the first language retrieved for the first text run and wherein, after the first text run is rendered, the second text run is rendered according to the at least two different font types associated with only the different language retrieved for the second text run, wherein the second text run is automatically rendered immediately following the rendering of the first text run after the selection of the font scheme for applying to the text selection; and wherein the selection of the font scheme for applying the text selection comprises a single action.

15. The computer storage device of claim 14, after retrieving the at least two different font types for the selected font scheme for each of the first and second text runs, associating a reference value with each of the retrieved at least two different font types.

16. The computer storage device of claim 15, wherein rendering the text selection includes calling each of the retrieved at least two different font types via the reference value associated with each of the retrieved at least two different font types.

17. A system for automatically switching fonts on multilingual text runs in a text selection, comprising:

a memory for storing executable program code; and a processor, functionally coupled to the memory, the processor being responsive to computer-executable instructions contained in the program code and operative:

to receive a text selection having a plurality of text runs, wherein a first text run is in a first language and wherein a second text run is in a second language;

to tag each of the first and second text runs with a language identification (ID) associated with each of the first and second languages;

to receive an indication of a selection of a font scheme for applying to the text selection, wherein the font scheme comprises a plurality of different font types for each of the plurality of text runs, the plurality of different font types including at least two different font types associated with only the first language in the first text run and at least two different font types associated with only the second language in the second text run, wherein the plurality of different font types in the font scheme are predefined font types, wherein an application of the at least two different font types associated with only the first language in the first text run to the second text run renders the second text run illegible;
to pass the language ID to an application programming interface (API) for querying a font scheme definition for the selected font scheme to determine the at least two different font types associated with only the first language in the first text run and the at least two different font types associated with only the different language in the second text run;
to map, via the API, the language ID to each of the at least two different font types;
to return, via the API, a reference value to a client application for each of the at least two different retrieved font types;
to call the plurality of font types for each of the first and second text runs;
to render the text selection, wherein the first text run is rendered according to the at least two different font types associated with only the first language retrieved for the first text run and wherein, after the first text run is rendered, the second text run is rendered according to the at least two different font types associated with only the different language retrieved for the second text run, wherein the second text run is automatically rendered immediately following the rendering of the first text run after the selection of the font scheme for applying to the text selection;
wherein the selection of the font scheme for applying the text selection comprises a single action.

18. The system of claim 17, wherein the processor is further operative to convert, via the API, the language ID into a script ID for mapping the script ID to each of the at least two different font types.

* * * * *